United States Patent

[11] 3,621,482

[72] Inventor Robert Adler
Northfield, Ill.
[21] Appl. No. 882,238
[22] Filed Dec. 4, 1969
[45] Patented Nov. 16, 1971
[73] Assignee Zenith Radio Corporation
Chicago, Ill.

[54] TUNABLE SURFACE-WAVE SIGNAL-TRANSLATING DEVICE
9 Claims, 6 Drawing Figs.

[52] U.S. Cl. .................... 333/72, 333/30, 250/211
[51] Int. Cl. .................... H03h 9/30, H03h 7/10
[50] Field of Search .................... 333/72, 30; 250/211, 213; 315/3; 310/8.1, 8.2, 8.6

[56] References Cited
UNITED STATES PATENTS

| | | | |
|---|---|---|---|
| 3,446,974 | 5/1969 | Seiwatz | 250/211 |
| 3,234,488 | 2/1966 | Fair | 333/30 |
| 3,360,749 | 12/1967 | Sittig | 333/72 |
| 3,446,975 | 5/1969 | Adler | 250/211 |
| 3,132,257 | 5/1964 | Yando | 333/30 |

*Primary Examiner*—Herman Karl Saalbach
*Assistant Examiner*—C. Baraff
*Attorney*—Francis W. Crotty

ABSTRACT: A filter has an acoustic-surface-wave propagating medium, a source and/or load for translating signals of different frequencies within a given range and a plurality of pairs of interleaved conductive combs formed on a surface of the medium with each comb pair having a unique intertooth spacing such that the comb pairs individually respond to different assigned frequencies within the range. The structure includes a plurality of conductive ribbons that are laterally spaced successively apart across a portion of the medium and a pair of conductive strips oriented generally transverse to the ribbons is coupled across the source or load. Sandwiched between the strips and ribbons is a layer of photoconductive material. A light source illuminates at least two discrete regions of the photoconductive layer disposed individually on respective different ones of the strips in alignment with respective different ones of the ribbons. In one version, the illuminated regions each overlie respective different groups of ribbons with those different groups together then serving as the teeth of the interleaved combs. In another version, different pairs of the ribbons are coupled across respective different interleaved comb pairs and the illumination of crossing points, as between the strips and different pairs of the ribbons, selectively coupled different ones of the comb pairs to the strips. In both versions, the strips are coupled to the source or load.

Inventor
Robert Adler
By Francis W. Crotty
Attorney

Inventor
Robert Adler
By Francis W. Crotty
Attorney

TUNABLE SURFACE-WAVE SIGNAL-TRANSLATING DEVICE

The present invention pertains to light-activated solid-state surface-wave devices. More particularly, it pertains to acoustic-surface-wave filters in which projected light patterns determine the frequency at which the filter is selective.

To the end of providing selectivity of a program carrier in the signal transmission channels of television receivers and in other systems, the copending application of Adrian DeVries, Ser. No. 721,038, filed Apr. 12, 1968, assigned to the same assignee as the present application, discloses and claims a variety of devices in which transducers interact with acoustic surface waves propagated on a substrate. By appropriate selection of the propagating material and design of the transducers, a wide variety of different selectivity characteristics may be obtained. These acoustic-wave devices may be fabricated entirely with integrated-circuit techniques and their overall sizes at television frequencies involve but fractions of an inch. Consequently, they lend themselves admirably to combination with other active and passive elements as portions of a completely integrated solid-state system.

Because of its nature, such a device has been denoted as a surface-wave integratable filter and, for convenience, has come to be known by the abbreviation SWIF. In a typical SWIF, a transducer having an electrode array composed of interleaved combs of conductive teeth at alternating electrical potentials, when coupled to a wave-propagating medium, produces acoustic surface waves on the medium. A similar transducer responds to those waves to develop an output signal. In principle, the tooth pattern is analogous to an antenna array. Consequently, similar selectivity is possible, thereby eliminating the need for the much larger and more cumbersome components normally associated with selective circuitry.

In many applications where tuning among different frequencies or signal channels is required, as for example in the radio frequency stage or tuner of a television receiver, it is highly desirable that such selective elements be themselves adjustable. That is, the center frequency of the SWIF should be adjustable. In Adler et al. U.S. Pat. No. 3,446,975, issued May 27, 1969, tunability is provided by utilizing an optical system to project the desired transducer pattern. Specifically, a plurality of teethlike areas are projected onto a photoconductively treated substrate to complete the formation of interleaved comb-shaped conductive elements. Use of the projection of optical patterns to afford SWIF tunability is also taken advantage of in the different SWIF embodiments disclosed in Seiwatz U.S. Pat. No. 3,446,974, issued May 27, 1969. In one version disclosed in the Seiwatz patent, a plurality of fine conductive ribbons are disposed on the substrate and at least in part underlie a photoconductive layer. Spaced from and running along the ends of the ribbons is a conductive strip. Upon illumination of a region of the photoconductor overlying a group of several adjacent ribbons as well as a portion of the strip, the illuminated region serves to electrically connect the strip to that group of ribbons whereby the latter serve as a tooth of a transducer comb. By similarly including another strip at the other ends of the ribbons and simultaneously illuminating staggered sets of regions spaced along the respective strips, an entire interleaved comb pattern if formed. Variation of the spacing between the regions serves to tune the comb array to different signal frequencies.

The ribbon structure of the Seiwatz embodiment is attractive in that the transducer region is rendered anisotropic. That is, electrical conductivity is substantially higher in the direction of the comb teeth than in the transverse direction between the teeth. Nevertheless, at least when using readily available and reasonably inexpensive photoconductive materials, the structure specifically disclosed in the Seiwatz patent may be disadvantageous in at least some applications. The signal currents, which must flow between the ribbons and the strips in the plane of the photoconductive layer, encounter substantially higher resistance than is the case when the entire comb electrode array is formed of an integral conductive material such as gold, aluminum or copper. This arises because the resistivity of practical photoconductive materials is much greater than the resistivity, of, for example, copper. Consequently, undesirably high losses are encountered.

It is accordingly, a general object of the present invention to provide tunable SWIF systems in which the aforementioned difficulties and disadvantages are overcome.

A more specific object of the present invention is to provide a new and improved tunable SWIF system of the optically controlled type in which losses in the signal-transmission path at radio frequencies are substantially reduced.

Another object of the present invention is to provide new and improved approaches to the formation of optically activated SWIF transducers that contribute to increased flexibility of use and adaptation for use.

An optically controlled solid-state acoustic-surface-wave signal-translating device constructed in accordance with the present invention includes a substrate of piezoelectric material capable of propagating acoustic surface waves. A plurality of spaced surface electrodes composed of flat conductors are disposed on a major surface of the substrate. Overlying the surface electrodes and extending transversely thereof are a pair of elongated terminal conductors that are separated from the surface electrode conductors by a photoconductive material, and at least some of the conductors are transparent to radiation of a type which increases the photoconductor conductivity. An optical system illuminates selected portions of the photoconductor with that radiation through the transparent conductors, those selected portions being at cross points between the terminal conductors and the surface electrodes to establish electrical connections between selected ones of the surface electrodes and the respective terminal conductors to activate any of a plurality of different surface-wave transducer electrode patterns depending upon the particular ones of the surface electrodes which are activated by the electrical connections.

The features of the present invention which are believed to be novel are set forth with particularity in the appending claims. The organization and manner of operation of the invention, together with further objects and advantages thereof, may best be understood by reference to the following description taken in connection with the accompanying drawing, in the several figures of which like reference numerals identify like elements and in which:

Figure 1:
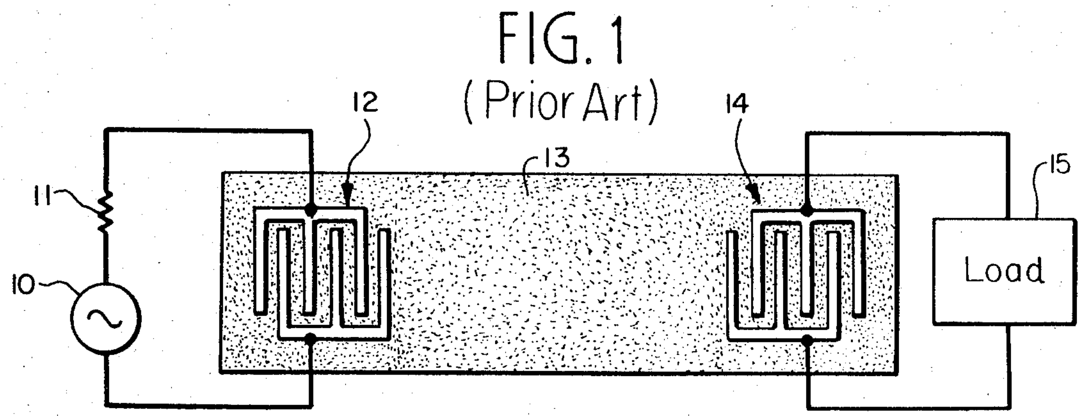
FIG. 1 (Prior Art)
FIG. 1 is a partly schematic plan view of a prior art SWIF.

For the purpose of explaining the basic nature and principles of operation of a SWIF in general, FIG. 1 illustrates one form of a very simple SWIF of a kind also contemplated as background in the aforementioned Adler et al. and Seiwatz patents. A signal source 10 in series with a resistor 11, which may represent the internal impedance of that source, is connected across an input transducer 12 mechanically coupled to one major surface of a body of piezoelectric material shown as a substrate 13 and which serves as an acoustic-surface-wave propagating medium. An output or second portion of the same surface of substrate 13 is, in turn, mechanically coupled to an output transducer 14 across which a load 15 is coupled. Transducers 12 and 14 in this simplest arrangement are identical and are constructed of two comb-type electrode arrays. The conductive teeth of one comb are interleaved with the teeth of the other. The combs are of a material, such as gold or aluminum, which may be vacuum deposited on a smoothly lapped and polished planar surface of the piezoelectric body.

The piezoelectric material is one, such as PZT, quartz or lithium niobate, that propagates acoustic surface waves. The distance between the centers of two consecutive teeth in each array is one-half of the acoustic surface wavelength on the piezoelectric material of the signal wave for which it is desired to achieve maximum response.

Direct piezoelectric surface-wave transduction is accomplished by the spatially periodic interdigital electrodes or teeth of transducer 12. A periodic electric field is produced when a signal from source 10 is fed to the teeth and, through piezoelectric coupling, the electric signal is transduced to a travelling acoustic wave on substrate 13. This occurs when the stress components produced by the electric field in the substrate are substantially matched to the stress components with the surface-wave mode. Source 10, for example, the radio frequency portion of a television receiver tuner, produces a range of signal frequencies, but due to the selective nature of the arrangement only a particular frequency and its intelligence-carrying sidebands are converted to surface waves. These surface waves are transmitted along the substrate to output transducer 14 where they are converted to an electrical signal for application to load 15 which in this example represents a subsequent radio frequency-input stage of the tuner such as the heterodyne converter which downshifts the signal frequency to an intermediate frequency.

In a typical television tuner embodiment, utilizing a lithium niobate ($LiNbO_3$) substrate, the teeth of both transducers 12 and 14 are each about 8 microns wide and are separated by a spacing of 8 microns for the application of a radio frequency signal in standard program channel thirteen within which the video carrier is located out 211.25 megahertz. This structure of transducers 12 and 14 together with substrate 13 can be compared to a cascade of two tuned circuits with a resonant frequency of approximately 210 megahertz, the resonant frequency being determined, in general, by the spacing of the teeth.

The potential developed between any given pair of successive teeth in electrode array 12 produces two waves traveling along the surface of substrate 13, in opposing directions, perpendicular to the teeth for the illustrative isotropic case of the ceramic which is poled perpendicularly to the surface. When the center-to-center distance between the teeth is one-half of the acoustic wavelength of the wave at the desired input frequency, or is an odd multiple thereof, relative maxima of the output waves are produced by piezoelectric transduction in transducer 12. For increased selectivity, additional electrode teeth are added the comb patterns of transducers 12 and 14. Further modifications and adjustments are described and others are cross-referenced in the aforementioned copending application for the purpose of particularly shaping the response presented by the filter to the transmitted signal.

Figure 2:
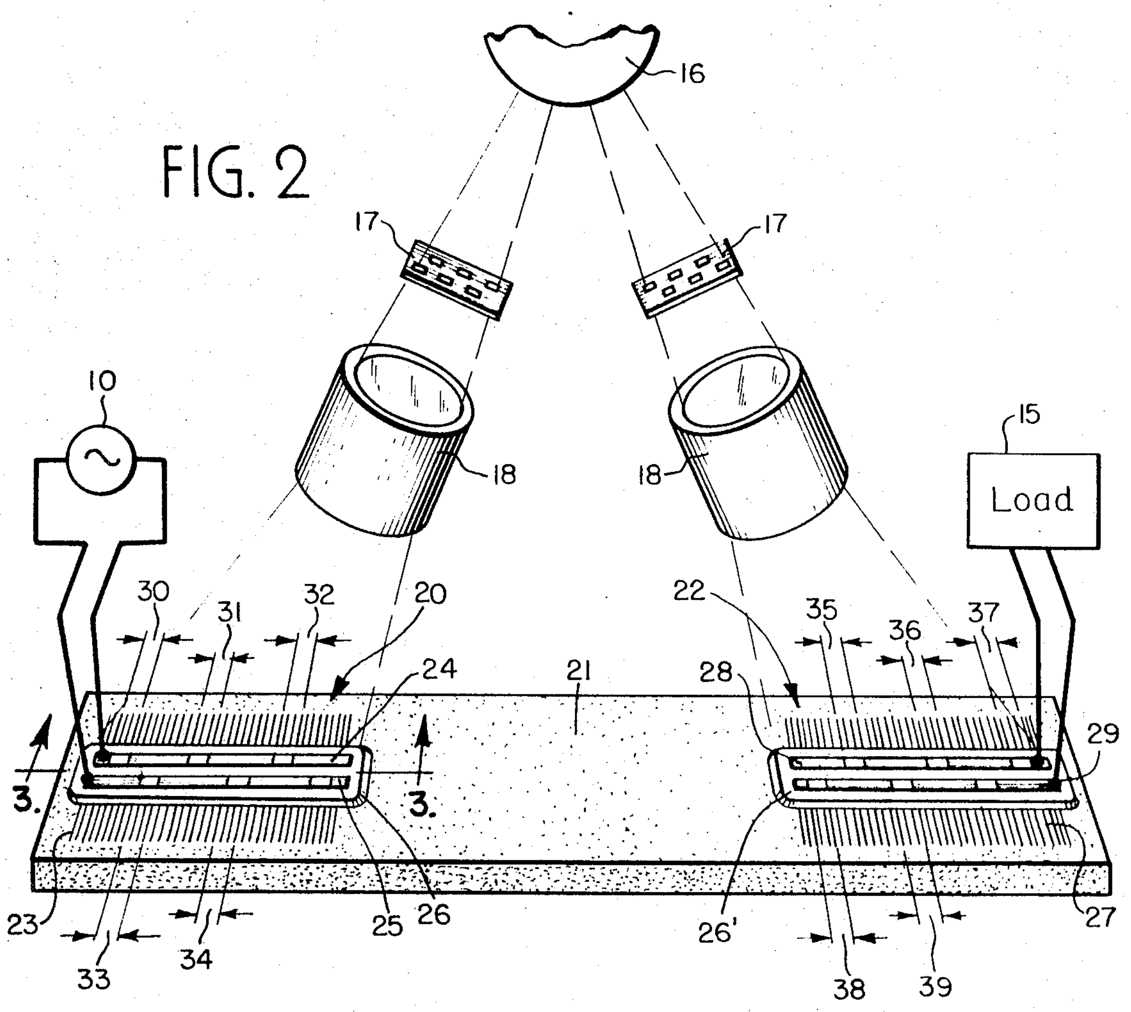
FIG. 2 is a partly schematic plan view of a SWIF similar in overall principle of operation to that of FIG. 1 but modified in accordance with one embodiment of the present invention.
Figure 3:
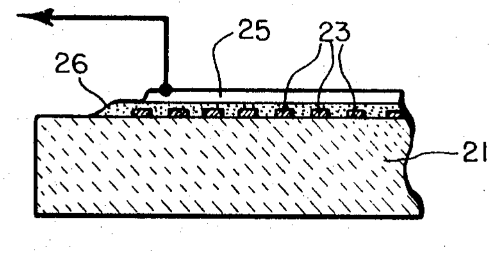
FIG. 3 is a fragmentary front elevational view of the SWIF of FIG. 2.

The general layout of the SWIF shown in FIG. 2 is the same as that in FIG. 1 insofar as signal source 10 is coupled to an input transducer 20 disposed on a wave-propagating piezoelectric substrate 21 and spaced from an output transducer 22 also disposed on that substrate and across which load 15 is coupled. In this embodiment, however, both the input and output transducers are specially formed so as to be activated as well as tuned or controlled in frequency by use of light, "light" being defined herein to include optical radiation in both the visible and invisible portions of the spectrum. To that end, transducer 20 includes a plurality of surface electrodes in the form of flat conductors or ribbons 23 closely spaced laterally along the propagating surface of substrate 21 and preferably affixed directly thereto. Overlying ribbons 23 and extending at least generally transverse to the ribbons is a pair of laterally spaced elongated terminal conductors or strips 24 and 25 across which source 10 is coupled. A layer 26 of photoconductive material, such as cadmium sulfide, is sandwiched between ribbons 23 and strips 24–25.

Output transducer 22 is similarly constructed of a plurality of fine-grained conductive ribbons 27 and a pair of conductive strips 28 and 29 oriented transverse to ribbons 27 and across which load 15 is coupled. Ribbons 27 and strips 28–29 also are separated by a layer of photoconductive material 26'.

To enable illumination of regions in the photoconductive layer immediately beneath different portions of strips 24–25 and 28–29, those strips are formed of a material, such as tin oxide, which is both conductive and at least partially transparent to light. Such illumination is for the purpose of creating, in the FIG. 2 embodiment, a comb-electrode array electrically equivalent to that of transducer 12 in FIG. 1. To this end, separate regions of photoconductive layer 26, lying respectively beneath strips 24 and 25, are selectively illuminated through those strips from a suitable source of light. While the particulars of the light source and its optical system may vary widely, a suitable such arrangement is disclosed in both of the aforesaid Adler et al. and Seiwatz patents as including light emitter 16, masks 17 to delineate the illuminated regions and conventional zoom lenses 18 for the purpose of focusing the illuminated areas upon the desired regions. As thus indicated in FIG. 2, the clear areas in strips 24–25 and 28–29 represent the regions or conductor cross points of the photoconductive layers in transducers 20 and 22 that are illuminated.

In the illuminated regions, the resistivity of the photoconductive material is substantially lower than in its unilluminated portions. Consequently, the illuminated regions establish a conductive path or electrical connection for the signals from source 10 or to load 15 respectively between strips 24–25 and 28–29 and the different groups of ribbons 23 and 27 that lie beneath the illuminated portions. The result is to effect the formation of what constitute conductive teeth 30, 31 and 32 conductively connected to strip 24 and teeth 33 and 34 conductively connected to strip 25 in transducer 20. Similarly, transducer 22 is caused to have conductive teeth 35, 36 and 37 connected to strip 28 together with interleaved conductive teeth 38 and 39 connected to strip 29.

Insofar as interaction with surface waves is concerned, the thus-formed interleaved teeth in the FIG. 2 SWIF function to launch and to recover surface-wave energy in the same manner as discussed above with respect to FIG. 1. As in the latter, the frequency of maximum response of the transducers is determined by the center-to-center spacing between adjacent teeth in the array. Consequently, in order to increase that frequency, it is merely necessary to move the illuminated regions closer together in the longitudinal direction of strips 24 and 25, for example; this may be achieved very simply by changing or varying the mask through which the light is projected. In that way, the different groups of ribbons 23 or 27 which then form the interleaved-comb array are closer together in correspondence with the shorter acoustic wavelength at the higher frequency. In the same way, any of a plurality of different surface-wave transducer patterns may be selectively activated, depending upon the particular ones of ribbons 23 or 27 that are activated by the photoelectrically established connections.

In order to take advantage of the anisotropic properties produced by the use of ribbons 23 and 27 and also to avoid unwanted interaction between the surface waves and the ribbons themselves in individually adjacent pairs, the spatial periodicity of the ribbons is sufficiently small that one-quarter acoustic wavelength preferably encompasses several ribbons at the highest signal frequency of interest. When still further reduction in the resistance presented to the signal transmission path is desired, additional electrically and physically paralleled sets of overlying conductive strips may be employed. The particular arrangement shown in FIG. 2 is advantageous in that the positioning of strips 24–25 and 28–29 near the central portions of ribbons 23 and 27 serves to reduce the effective series resistance presented by the ribbons. It is also to be noted that, at least in principle, some applications may require that only one optically tunable transducer need be employed with the other being of a wide-band fixed type; in that case, the signal transmission device coupled to the optically tunable transducer may be either the signal source or the load.

Figure 4:
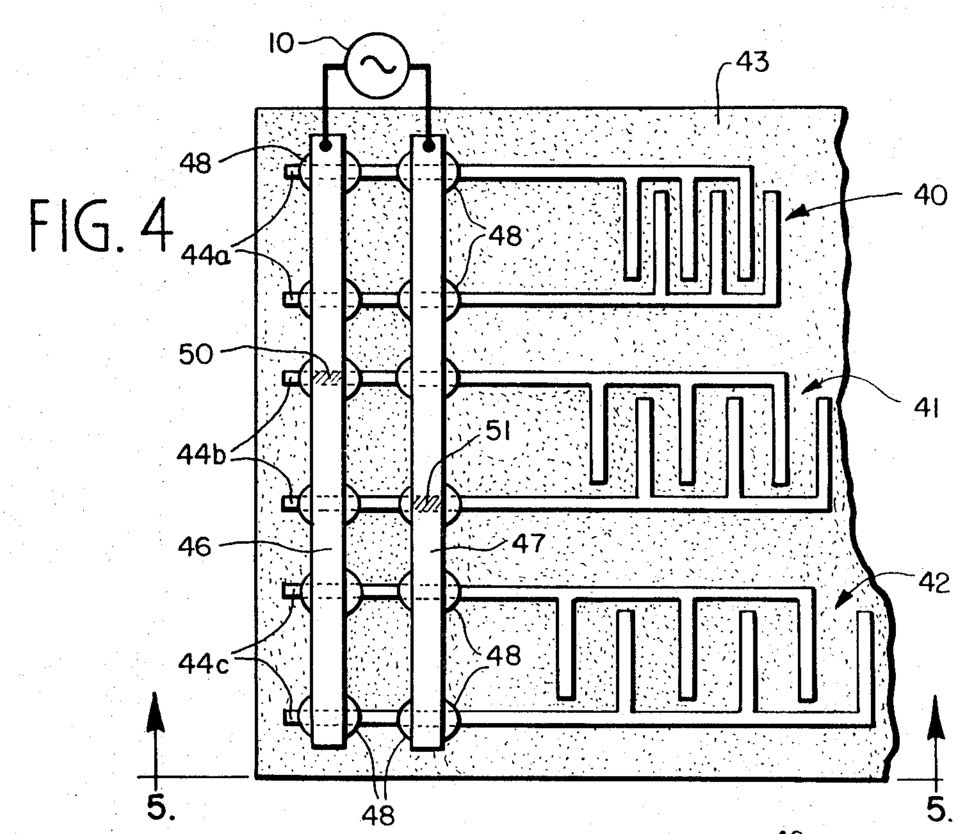
FIG. 4 is a partly schematic fragmentary plan view of an alternative to the embodiment of FIG. 2.

The arrangement of FIG. 4 differs in that the input section of the SWIF includes a plurality of different interleaved-comb arrays 40, 41 and 42 affixed to separate portions of a wave-propagating piezoelectric substrate 43. Only the input portion of substrate 43 is shown, since its output portion may be either a mirror image (except that it is coupled to a load) or otherwise arranged to have either a separate or a combined transducing arrangement responsive to the launched acoustic waves for developing an electric signal. By virtue of their mutual differences in tooth spacing, the transducers of arrays 40–42 respond to signals from source 10 of respective different frequencies or channels; having the smallest interelectrode spacing, array 40, therefore, would exhibit maximum response to the highest frequency channel.

Projecting laterally away from arrays 40–42 and coupled individually thereacross are corresponding pairs 44*a*, 44*b* and 44*c* of surface electrodes in the form of flat lead-in conductors or ribbons laterally spaced or distributed across the surface of substrate 43. Overlying ribbons 44*a*–44*c* and extending transverse thereto are a pair of light-transparent elongated terminal conductors or strips 46 and 47 across which source 10 is coupled. A layer 48 of photoconductive material is sandwiched between ribbons 44*a*–44*c* and strips 46–47 at each cross point between the different strips and ribbons.

Figure 5:
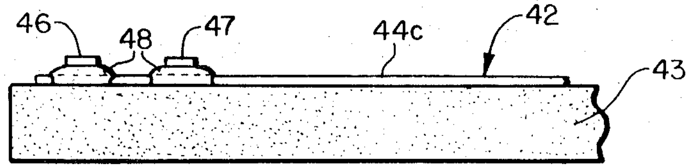
FIG. 5 is a front elevational view taken along the line 5—5 in FIG. 4.

Again associated with the multiple-channel SWIF of FIGS. 4 and 5 is an optical system (not shown but similar to that FIG. 2) capable of simultaneously illuminating selected portions of photoconductive material 48 through strips 46 and 47. As shown in FIG. 4, crosshatched areas 50 and 51 represent two discrete regions under illumination at a given time so that in those regions photoconductive material 48 is changed from its unilluminated-nonconductive state to a conductive state. Source 10 is thereby conductively connected across comb-array 41 which alone responds for this condition to source 10. By instead illuminating a pair of regions respectively aligned with ribbons 44*a* at the respective intersections with strips 46 and 47, source 10 may be conductively connected to comb-array 40 so that, for example, television signals in a different channel are converted into acoustic surface waves for transmission to a corresponding output transducer. Once again, any of a plurality of different transducer patterns may be selectively activated, depending upon the particular ones of ribbons 44*a*–44*c* that are activated by the photoelectrically established connections.

It will be observed that between each pair of ribbons 44*a*–44 and strips 46–47, a total of four "intersections" or possible regions of illumination exist. Each such intersection is composed of a pair of conductive electrodes separated by a dielectric material and thus constitutes a capacitor. Preferably, uniform widths and spacings are used in forming the conductive ribbons and strips so that all four of the resulting capacitors are of equal value. In consequence, under the condition in which all four "intersections," for example those of ribbon pair 44*a* and strips 46–47, remain unilluminated, the four capacitors together with the interconnecting portions of the ribbons and strips form a balanced bridge which decouples the associated comb array from strips 46 and 47.

Figure 6:
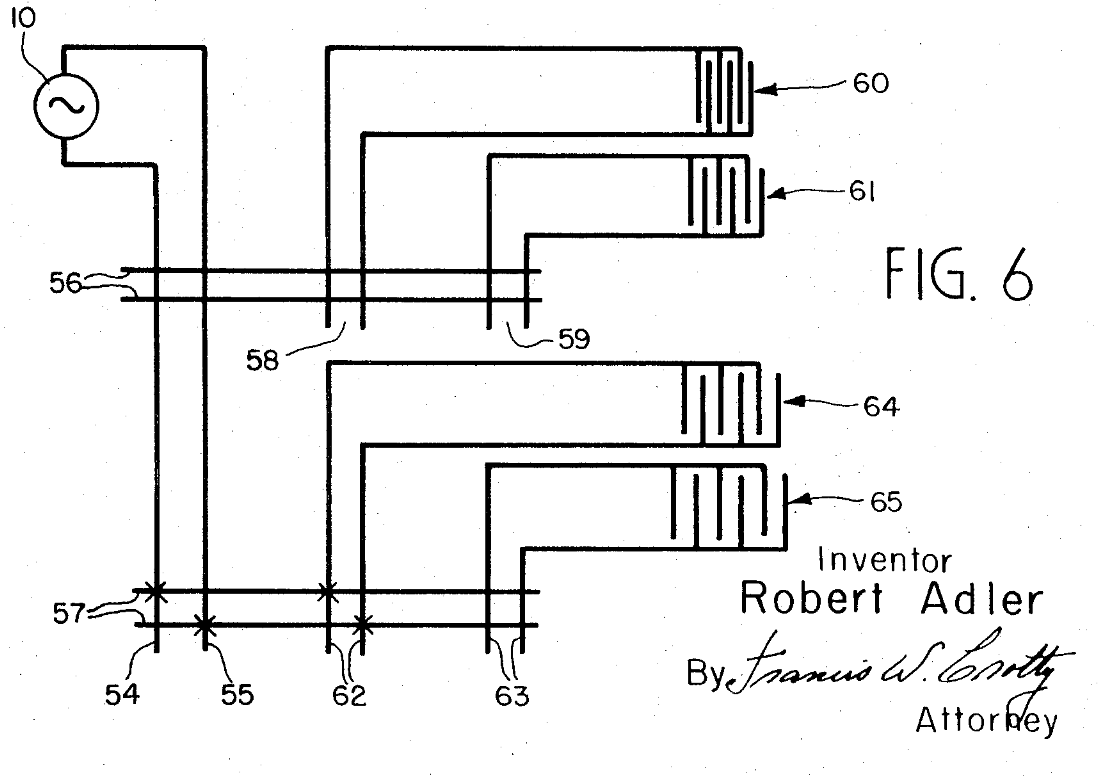
FIG. 6 is a schematic diagram of a modification of the embodiment of FIG. 4.

FIG. 6 represents a modification of FIG. 4 that permits a reduction in the capacitive load presented to the input conductive strips. Source 10 in this version is coupled across a pair of conductive strips 54 and 55 which overlie conductive ribbon pairs 56 and 57 and are separated therefrom by a layer of photoconductive material in the manner of FIG. 5. Ribbons 56 in turn are oriented transverse to and are separated by a photoconductive layer from another set of conductive ribbon-pairs 58 and 59 individually coupled across respective different comb-type transducers 60 and 61. Similarly, ribbon pair 57 forms photoconductive-layer-separated intersections with further ribbon pairs 62 and 63 individually connected respectively across still additional transducers 64 and 65. In operation, four spots of light are required in order to channel the signals from source 10 to a selected single input transducer. The spots of light are represented in FIG. 6 by crossmarks, indicating the selection of appropriate intersections so that the signal energy is fed to transducer 64. This general approach of branching and subbranching also lends added flexibility in selecting the particular physical configuration of the overall pattern of input or output transducers.

Several different embodiments have been disclosed each of which constitutes a SWIF system suitable to serve as the radiofrequency tuner of a television receiver for the purpose of selecting between different program channels. In common with at least most SWIFS, they are attractive at the outset because of their capability of fabrication in a solid-state package that also may include active components such as thin-film transistor amplifiers. As optically activated SWIF tuners, the disclosed arrangements are especially advantageous in that the photoconductive current flow is transversely through the thin layer of the photoconductor. Consequently, the losses are substantially reduced as compared with prior arrangements in which the signal currents flow parallel to the surface of the photoconductor. At the same time, even in the FIG. 2 version the conductive elements need not be closer together than one-half acoustic wavelength at the highest channel frequency. Consequently, the exemplary 8-micron spacing previously described for channel thirteen operation involves conductive-material-deposition techniques that are well within the state of the present-day photoetching art. Moreover, there is no need in any of the disclosed optically tuned SWIFS for the projection of precisely defined optical patterns or illuminated regions; such requirements are even more relaxed in the embodiments of FIGS. 4 and 5. In any of the embodiments, however, the most that is required are simple and comparatively inexpensive optical lens elements.

Not only do the disclosed arrangements increase conductance for signal transmission through the photoconductive switching layer, but the geometry afforded by feeding the signal currents transversely through the photoconductor affords beneficial flexibility in choosing the layout of the different ribbons and strips. Moreover, the performance of the photoconductive switches, formed at each intersection by the pair of conductive portions separated by the photoconductor, does not depend upon the particular shape of the switch. That is, such a switch constitutes a resistance R when closed and a capacitive reactance X when opened. The ratio of R/X may be considered a figure of merit of the switch and ordinarily should be as small as possible. It may be shown that this figure of merit is equal to the product of the illuminated resistivity in ohm-centimeters, the dielectric constant of the photoconductive material in Farads/centimeter and the angular signal frequency $\omega$. Accordingly, geometrical configurations other than those specifically illustrated may be employed without detriment when desirable in connection with changed layout of the various different conductive elements.

While particular embodiments of the present invention have been shown and described, it will be obvious to those skilled in the art that changes and modifications may be made without departing from the invention in its broader aspects. Accordingly, the aim in the appended claims is to cover all such changes and modifications as fall within the true spirit and scope of the invention.

I claim:

1. An optically controllable solid-state acoustic-surface-wave signal-translating device comprising:
   - a substrate of piezoelectric material capable of propagating acoustic surface waves;
   - a selectable transducer arrangement including a plurality of spaced surface electrodes composed of flat conductors on a major surface of said substrate;
   - a pair of elongated terminal conductors, transparent to a predetermined type of radiation, extending transversely of said surface electrodes;
   - a layer of photoconductive material, of a type which increases its conductivity in response to exposure to said radiation, interposed between the intersections of said terminal conductors with said surface electrodes;

and an optical system for projecting said radiation upon selected ones of said intersections of said terminal conductors and said surface electrodes to establish electrical connections between selected ones of said surface electrodes and said respective terminal conductors to activate any of a plurality of different surface-wave transducer electrode patterns depending upon the particular ones of said surface electrodes which are activated by said electrical connections.

2. A device as defined in claim 1 in which said flat conductors are disposed transversely of the acoustic-wave propagating path in said substrate and are spaced along said path by a distance no greater than one-half acoustic wavelength in said substrate of waves at the highest frequency of a signal to be translated and in which said selected intersections are mutually spaced in the direction of said path by an effective distance equal to one-half acoustic wavelength in said substrate at the frequency of a selected signal.

3. A device as defined in claim 2 in which said terminal conductors are in spaced parallel relation to one another and are disposed generally centrally with respect to the length of said flat conductors and in which said selected intersections alternate between said pair of terminal conductors and are spaced from one another in the direction of said path of acoustic-wave propagation.

4. A device as defined in claim 3 in which said selected portions each overlie a respective plurality of successive ones of said flat conductors.

5. A device as defined in claim 1 in which said transducer arrangement further includes a plurality of pairs of interleaved conductive combs individually disposed on respective different portions of said substrate and in which different pairs of said flat conductors are electrically coupled individually across respective different ones of said pairs of combs.

6. A surface-wave filter for connection to a device for translating signals having frequencies within a given frequency range comprising:

a medium propagative of acoustic surface waves of frequencies within said range;

a plurality of conductive ribbons disposed transversely of a surface of said medium and laterally spaced from one another by a distance no greater than one-half acoustic wavelength in said medium of said waves at the highest frequency of said range;

a layer of photoconductive material overlying the median sections of said ribbons;

a pair of light-transparent-conductive strips, overlying said layer and oriented in spaced relation to one another and generally transverse to said ribbons, for connecting to said signal-translating device;

and a source of light for illuminating at least two discrete regions of said strips mutually spaced in a direction transverse to said ribbons by an effective distance equal to one-half acoustic wavelength in said medium at a selected frequency within said range and individually disposed on respective ones of said strips.

7. A surface-wave filter in accordance with claim 6 in which a plurality of longitudinally spaced discrete regions of each of said strips is illuminated, and in which each illuminated region of each strip is spaced from the closest illuminated regions of the other strip by one-half acoustic wavelength in said medium at said selected frequency.

8. A surface-wave filter for connection to a device for translating signals having frequencies within a given frequency range comprising:

a medium propagative of acoustic surface waves;

a plurality of pairs of interleaved conductive combs disposed on said surface with each pair individually having lead-in conductor portions and further have a unique intertooth spacing to respond to an assigned different frequency in said range;

a pair of light-transparent-conductve strips for connecting to said signal-translating device extending transversely across said lead-in conductor portions of said plurality of combs;

a layer of photoconductive material interposed between the intersections of said light-transparent strips with said lead-in conductor portions of said plurality of combs;

and a source of light for illuminating at least two discrete regions of said material through portions of said strips that are in alignment with said lead-in conductor portions of a selected one of said combs.

9. A surface-wave filter in accordance with claim 8 in which said light source illuminates selected regions of said material to effect a response from only a selected one of said pairs of combs.